(12) United States Patent
Fischer et al.

(10) Patent No.: US 11,318,864 B2
(45) Date of Patent: May 3, 2022

(54) VEHICLE SEAT HAVING A DRIVE DEVICE

(71) Applicant: Adient Engineering and IP GmbH, Burscheid (DE)

(72) Inventors: Georg Fischer, Winnweiler (DE); Lars Kramm, Trippstadt (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/145,706

(22) Filed: Jan. 11, 2021

(65) Prior Publication Data

US 2021/0229573 A1    Jul. 29, 2021

(30) Foreign Application Priority Data

Jan. 23, 2020   (DE) ..................... 10 2020 101 545.3
Apr. 28, 2020   (DE) ..................... 10 2020 111 489.3

(51) Int. Cl.
*B60N 2/02*    (2006.01)
*B60N 2/16*    (2006.01)

(52) U.S. Cl.
CPC ........... *B60N 2/0232* (2013.01); *B60N 2/164* (2013.01); *B60N 2/165* (2013.01); *B60N 2/1625* (2013.01); *B60N 2002/0236* (2013.01)

(58) Field of Classification Search
CPC .. B60N 2/0232; B60N 2/0224; B60N 2/1625; B60N 2/164; B60N 2/165; B60N 2/1635; B60N 2002/0236

USPC ..................................................... 297/344.17
See application file for complete search history.

(56) References Cited

FOREIGN PATENT DOCUMENTS

| DE | 19709852 A1 | 9/1998 | |
|---|---|---|---|
| DE | 10042851 A1 | 3/2002 | |
| DE | 102009014651 A1 | 12/2010 | |
| DE | 102016001564 A1 * | 8/2017 | ............. B60N 2/165 |
| DE | 102016001564 A1 | 8/2017 | |
| DE | 102017206994 A1 | 10/2018 | |
| WO | 2014114585 A1 | 7/2014 | |
| WO | 2015104228 A1 | 7/2015 | |

* cited by examiner

*Primary Examiner* — Mark R Wendell
(74) *Attorney, Agent, or Firm* — Marshall & Melhorn, LLC

(57) ABSTRACT

A vehicle seat having a drive device for driving a adjustment kinematics of the vehicle seat may have an adjustment arm, and a tensioning device. The drive device may have a pinion which can be rotated about a pinion rotation axis and which is in toothed engagement with a tooth segment of the adjustment arm. The tensioning device pretensions the adjustment arm so that the tooth segment is pretensioned in the direction of the pinion. The tensioning device has at least one sliding element which is in abutment with the adjustment arm. During an actuation of the height adjustment kinematics, the at least one sliding element slides along the adjustment arm. The sliding element is resiliently pretensioned by a resilient element.

8 Claims, 3 Drawing Sheets

VEHICLE SEAT HAVING A DRIVE DEVICE

Figure 1:
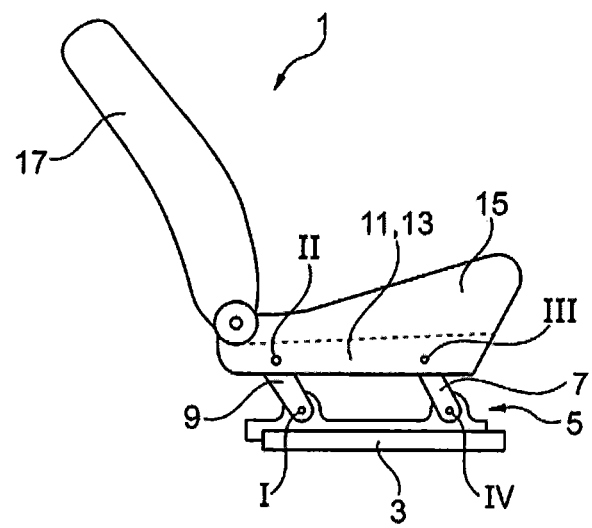

The invention relates to a vehicle seat having a drive device, in particular a drive device for driving a height adjustment kinematics of the vehicle seat, an adjustment arm, in particular for activating the height adjustment kinematics, and a tensioning device, the drive device having a pinion which can be rotated about a pinion rotation axis and which is in toothed engagement with a tooth segment of the adjustment arm, wherein the tensioning device pretensions the adjustment arm in such a manner that the tooth segment is pretensioned in the direction of the pinion, wherein the tensioning device has at least one sliding element which is in abutment with the adjustment arm, wherein, during an actuation of the height adjustment kinematics, the at least one sliding element slides along the adjustment arm.

PRIOR ART

DE 100 42 851 A1 discloses a height-adjustable underframe of a motor vehicle seat having a left and a right rail pair of a longitudinal adjustment device and having a left and a right side portion which are connected in an articulated manner via a rear and a front link to the associated seat rail of the rail pair, respectively, wherein there is provided an adjustment arm which is articulated with a lower end region at an articulation location of a rear link to the associated seat rail and which is releasably secured in the vicinity of the upper end thereof in a locking device which is secured to the associated side portion.

WO 2014/114585 A1 discloses a height adjuster for a vehicle seat comprising at least one link which can be pivoted relative to a side portion about an articulation location, and an adjustment arm which has a tooth portion which can be pivoted about a bearing location, and a pinion which can be rotated about a rotation axis and which for height adjustment cooperates with the tooth portion. The tooth portion is formed in an elongate hole of the adjustment arm facing away from the articulation location of the link.

WO 2015/104228 A1 discloses a height adjuster for a vehicle seat, comprising at least one link which can be pivoted relative to a side portion about an articulation location, and an adjustment arm which has a tooth portion and which can be pivoted about a bearing location and a pinion which can be rotated about a rotation axis and which cooperates with the tooth portion for height adjustment, wherein the tooth portion is configured in such a manner that, in the event of a movement of the pinion relative to the tooth portion, the spacing of the rotation axis from the bearing location changes, wherein the shape of the tooth portion is constructed to be convex or linear.

DE 10 2017 206 994 A1 discloses a vehicle seat having a drive device for driving a height adjustment kinematics of the vehicle seat, an adjustment arm, in particular for activating the height adjustment kinematics and a tensioning device, the drive device having a pinion which can be rotated about a pinion rotation axis and which is in toothed engagement with a tooth segment of the adjustment arm, wherein the tensioning device pretensions the adjustment arm in such a manner that the tooth segment is pretensioned in the direction of the pinion, wherein the tensioning device has at least one sliding element which is movably guided in a housing, wherein the at least one sliding element is in abutment with the adjustment arm.

Problem

An object of the invention is to improve a vehicle seat of the type mentioned in the introduction. In particular, play between a pinion of a drive device and an adjustment arm as required for the assembly of the vehicle seat, in particular the assembly of a height adjustment kinematics of the vehicle seat, is intended to be minimised. Rattling noises during an adjustment operation, in particular a height adjustment of the vehicle seat, and also during the operation of the vehicle seat are intended to be minimised, ideally to be prevented. The adjustment arm is intended to be held in engagement with the driving pinion. In order to compensate for tolerances and to prevent damage to the drive, a gap between the counter-holder and the toothed rack must be maintained. When vibrations occur or when sitting in the seat, this gap leads to movements of the toothed rack and as a result noises. These should be permanently prevented for the service-life of the seat. At the same time, it must be ensured that, in the event of a crash, the tooth overlap between the pinion and tooth segment is maintained in order to enable the crash loads to be received in a reliable manner.

Solution

This object is achieved according to the invention with a vehicle seat having a drive device, in particular a drive device for driving a height adjustment kinematics of the vehicle seat, an adjustment arm, in particular for activating the height adjustment kinematics, and a tensioning device, the drive device having a pinion which can be rotated about a pinion rotation axis and which is in toothed engagement with a tooth segment of the adjustment arm, wherein the tensioning device pretensions the adjustment arm in such a manner that the tooth segment is pretensioned in the direction of the pinion, wherein the tensioning device has at least one sliding element which is in abutment with the adjustment arm, wherein, during an actuation of the height adjustment kinematics, the at least one sliding element slides along the adjustment arm. The sliding element is resiliently pretensioned, in particular by means of a resilient element.

As a result of the fact that the sliding element is resiliently pretensioned, in particular by means of a resilient element, play between the pinion of the drive device and the adjustment arm as required for the assembly of the vehicle seat, in particular a height adjustment kinematics of the vehicle seat, is minimised.

Rattling noises during an adjustment operation, in particular a height adjustment of the vehicle seat, and in the respective position for use are prevented.

Advantageous embodiments which can be used individually or in combination with each other are set out in the dependent claims.

The sliding element is preferably produced from a resilient material, in particular a spring steel. This has advantages in the event of very high loads during operation and in the event of a crash, in which the use of a plastics material element as a sliding element is not sufficient with respect to wear and permissible surface pressure. The sliding element may be bent from a spring wire or a spring sheet.

The sliding element may have a first end region. The sliding element may have a second end region. The first end region may be supported by way of a first support means on a structural component of the vehicle seat, in particular on a side portion of a seat frame. The second end region may be supported by way of a second support means on the structural component of the vehicle seat, in particular on the side portion of the seat frame.

The sliding element may have between a first end region and a second end region a contact region for abutment with the adjustment arm. The contact region may, in particular in a state pretensioned by the resilient element, be in abutment with the adjustment arm.

The drive device may be a manual drive device. The drive device may have a pinion which can be driven manually and which is in toothed engagement with the tooth segment. A manual drive device is known, for example, from DE 10 2009 014 651 A1.

The drive device may be an electrified drive device, wherein the pinion is a component of an electromotive drive device, as known, for example, from DE 197 09 852 A1.

A rotation of the pinion about a pinion rotation axis preferably brings about a relative movement between the adjustment arm and the at least one sliding element. In particular, the rotation of the pinion about the pinion rotation axis brings about a relative movement between the adjustment arm and another component of the vehicle seat on which the drive device is arranged. Since the sliding element is a component of the tensioning device, a rotation of the pinion about the pinion rotation axis additionally brings about a relative movement between the adjustment arm and the tensioning device.

Preferably, the height adjustment kinematics has a base, a side portion, a front link and a rear link. The base, the side portion, the front link and the rear link can form four coupling members of a four-bar arrangement, wherein a first pivot joint pivotably connects the base to the rear link, a second pivot joint pivotably connects the rear link to the side portion, a third pivot joint pivotably connects the side portion to the front link and a fourth pivot joint pivotably connects the front link to the base. Preferably, the adjustment arm in addition to the drive of the four-bar arrangement preferably brings about a blocking of the four-bar arrangement in a non-driven state. Preferably, to this end, the drive device is configured to be self-locking so that the pinion cannot be rotated when the electric motor is switched off (in the case of an electrified drive device), or an actuation lever remains inactivated (in the case of a manual drive device).

A region of the adjustment arm facing away from the tooth segment is preferably articulated to one of the coupling members in an eccentric manner with respect to the pivot joints, wherein the drive device is articulated to another of the coupling members. The region of the adjustment arm facing away from the tooth segment may be articulated to the rear link. The drive device and the tensioning device may be secured to the side portion.

The invention is not limited to a drive of a height adjustment kinematics and/or a four-bar arrangement of the vehicle seat. Instead, any adjustment kinematic systems which can be adjusted by means of an adjustment arm may advantageously have a corresponding tensioning device for an adjustment arm.

In summary and in other words, as a result of the introduction of a sliding element which is pressed by means of a pressure piece onto the rear side of the toothed rack, bearing play is compensated for and tolerances are compensated for. A (in particular tolerance-related) movement of the toothed rack between the counter-holder and pinion is prevented depending on the load level or at least damped to such an extent that noises are effectively prevented. In addition, a sliding element of spring steel may transmit pressure forces and support the toothed rack in the event of a crash. During permanent operation, the sliding element enables wear-free operation since the material is sufficiently hard. A use of a steel spring as the only element for producing a pressing force (pressure piece) may not be possible in demanding structural space situations since the high forces required with conventional steel spring tolerances cannot be applied in an operationally reliable manner. For this reason, a pressure piece of elastomer material is preferably provided in order to produce the pressing force.

FIGURES AND EMBODIMENTS OF THE INVENTION

Figure 2:
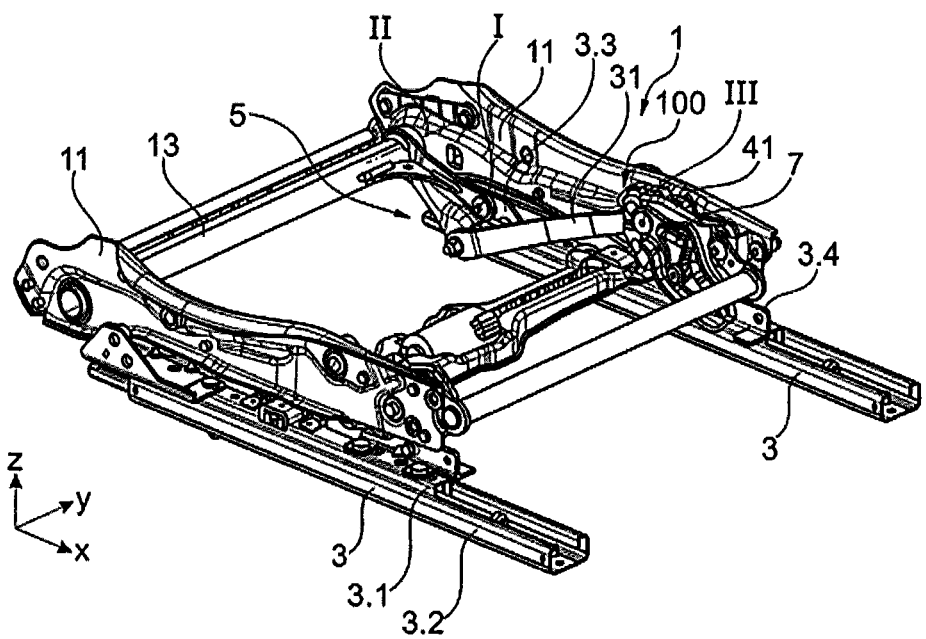
Figure 3:
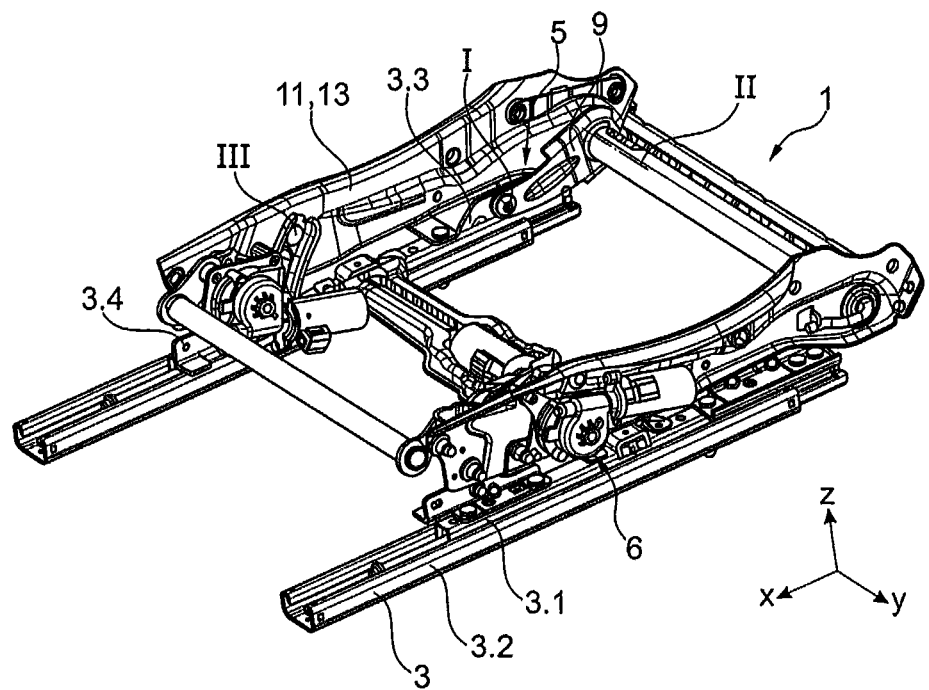
Figure 4:
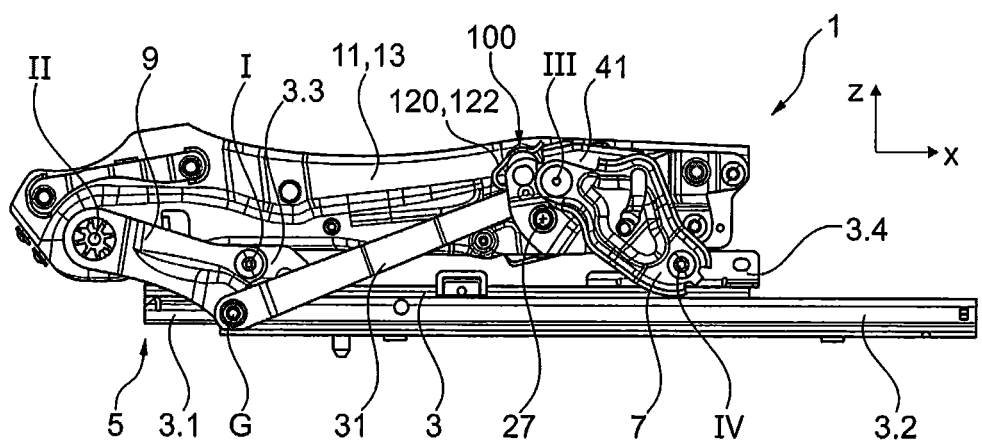
Figure 5:
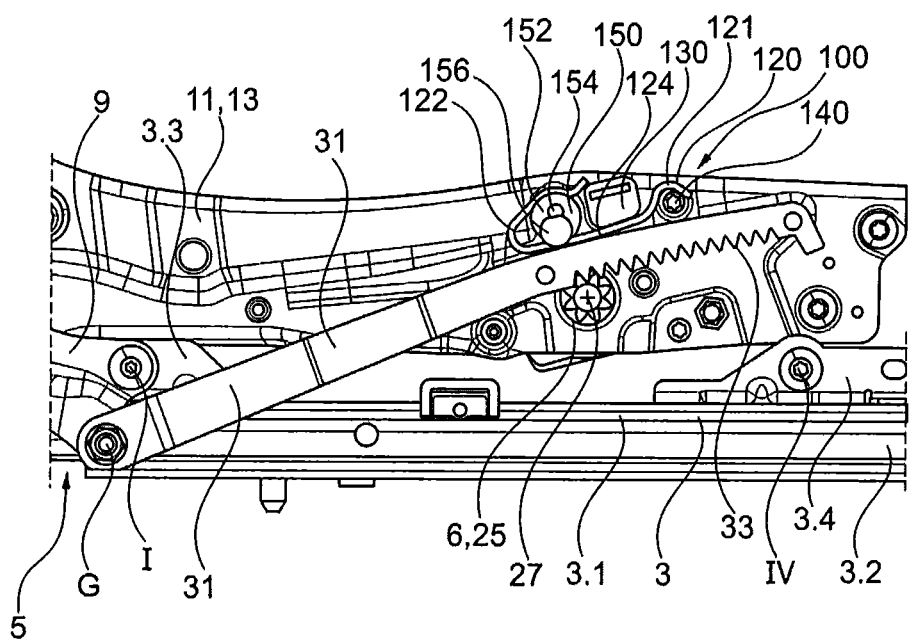

The invention is explained in greater detail below with reference to an advantageous embodiment illustrated in the Figures. However, the invention is not limited to this embodiment. In the drawings:

FIG. 1: is a schematic side view of a vehicle seat according to the invention,

FIG. 2: is a perspective view of the seat structure of a vehicle seat according to the invention according to a first embodiment in a lowest height adjustment position, wherein a cushion and a backrest are not illustrated, FIG. 3: is another perspective view of the seat structure from FIG. 2 from a different perspective with respect to FIG. 1, wherein a cushion and a backrest are not illustrated, FIG. 4: is a side view from the direction of a seat centre towards an inner side of the seat structure from FIG. 2, wherein a cushion and a backrest are not illustrated, and FIG. 5: is a cut-out corresponding to FIG. 4, wherein a front link is not illustrated.

A vehicle seat 1 schematically illustrated in FIG. 1 and a preferred embodiment of a vehicle seat 1 according to the invention as illustrated in FIGS. 2 to 5 are described below using three spatial directions which extend perpendicularly to each other. A longitudinal direction x extends in a vehicle seat 1 which is installed in the vehicle in a substantially horizontal manner and preferably parallel with a vehicle longitudinal direction which corresponds to the conventional travel direction of the vehicle. A transverse direction y which extends perpendicularly to the longitudinal direction x is also orientated horizontally in the vehicle and extends parallel with a vehicle transverse direction. A vertical direction z extends perpendicularly to the longitudinal direction x and perpendicularly to the transverse direction y. With a vehicle seat 1 which is installed in the vehicle, the vertical direction z extends parallel with the vehicle vertical axis.

The position and direction indications used, such as, for example, front, rear, top and bottom, relate to a viewing direction of a passenger sitting in the vehicle seat 1 in a normal sitting position, wherein the vehicle seat 1 is installed in the vehicle, is in a position for use suitable for transporting passengers with an upright backrest 17 and is orientated in conventional manner in the travel direction.

The vehicle seat 1 according to the invention can, however, also be fitted in a different orientation, for example, transversely relative to the travel direction.

The vehicle seat 1 for a motor vehicle can be secured to the vehicle base of the motor vehicle by means of a base 3, for example, having two seat rail pairs each having an upper rail 3.1 which is secured to the seat and a lower rail 3.2 which can be fixedly secured to the vehicle. A height adjustment kinematics 5 of the vehicle seat 1 has when viewed in the transverse direction y at both vehicle seat sides a four-bar arrangement which is formed in each case from the base 3, a front link 7, a rear link 9 and a side portion 11 of a seat frame 13. which are connected to each other by means of pivot joints I, II, III, IV, respectively.

At both sides, a first pivot joint I connects the base 3, in this instance a rear adapter portion 3.3 which is secured to the upper rail 3.1 of the base 3, pivotably to the rear link 9 in each case. At both vehicle seat sides, a second rotary joint II pivotably connects the respective rear link 9 to the respective side portion 11. At both vehicle seat sides, a third rotary joint III pivotably connects the side portion 11 or an adapter 41 of the side portion 11 to the front link 7 in each case. At both vehicle seat sides, a fourth rotary joint IV pivotably connects the front link 7 to the base 3 in each case, in this instance pivotably to a front adapter portion 3.4 which is secured to the upper rail 3.1. The seat frame 13 comprises in a manner known per se at both vehicle seat sides a side portion 11, in this instance a seat frame side portion. The rotary joints I, II, III, IV enable in each case a rotational movement about an axis parallel with the transverse direction y in each case.

The seat frame 13 carries a seat cushion 15 and in this instance also the backrest 17. By means of the height adjustment kinematics 5, the height of the seat cushion 15 and in this instance at the same time the backrest 17 of the vehicle seat 1 can be adjusted via the vehicle base (and consequently via the base 3).

In order to drive and lock the height adjustment kinematics 5, there is provided at least one drive device 6 which acts on a vehicle seat side between two gear members of the four-bar arrangement at that location, in this instance between one of the two seat portions 11 and an adjustment arm 31 which is provided with a tooth segment 33 and which is rotatably connected to one of the two rear links 9 by means of a joint G which is spaced apart from the first pivot joint I. The adjustment arm 31 is in this instance a slightly curved toothed rack. The adjustment arm 31 which is in this instance directly driven by the drive device 6 serves to activate the height adjustment kinematics 5.

The adjustment arm 31 is in this instance constructed to be curved in a concave manner in the direction of the base 3. The adjustment arm 31 has the tooth segment 33 which is in toothed engagement with a pinion 25 of the drive device 6. An end of the adjustment arm 31 remote from the tooth segment 33 is pivotably articulated by means of the joint G to one of the two rear links 9. In a modification of the embodiment, the adjustment arm 31 may also be a straight or a differently curved toothed rack.

The drive device 6 has a pinion 25 which can be driven in an electromotive manner about a pinion rotation axis and which is in toothed engagement with the tooth segment 33. The pinion rotation axis 27 extends parallel with the transverse direction y. The drive device 6 corresponds, for example, to a drive device known from DE 197 09 852 A1 and is preferably screwed by means of a plurality of screws to the associated side portion 11. In a modification of the embodiment, the pinion 25 is a component of a mechanical drive device, as known, for example, from DE 10 2009 014 651 A1.

If the drive device 6 is driven, it pivots via the adjustment arm the two associated gear members, in this instance the side portion 11 and the rear link 9, relative to each other so that via the height adjustment kinematics 5 the height of the seat cushion 15 and the backrest 17 can be adjusted relative to the base 3.

The tooth segment 33 is pretensioned by means of a tensioning device 100 in the direction of the pinion 25, whereby play between the pinion 25 and the tooth segment 33 is eliminated, but at least reduced. The tensioning device 100 has a sliding element 120 which is resiliently pretensioned by a resilient element 130 in such a manner that a portion of the sliding element 120 facing away from the resilient element 130 is resiliently in abutment with the adjustment arm 31. In this instance, the sliding element 120 and the resilient element 130 are resiliently pretensioned in such a manner that the sliding element 120 is resiliently in abutment with the adjustment arm 31. During the adjustment of the height adjustment kinematics 5, the sliding element 120 slides along the adjustment arm 31. The resilient element 130 is constructed separately from the sliding element 120. Consequently, the resilient element 130 and the sliding element 120 are not constructed in one piece.

The sliding element 120 is produced from a resilient material, in this instance from a spring steel. The sliding element 120 is preferably bent from a spring wire or a spring sheet. The sliding element 120 has an elongate extent and has two end regions 121, 122. A first end region 121 of the sliding element 120 is bent in the manner of a circular segment, in this instance bent in the manner of a circular segment through an angle between 90 and 180 degrees. A second end region 122 of the sliding element 120 is bent, in this instance bent through an angle between 180 and 270 degrees. Between the first end region 121 and the second end region 122, the sliding element 120 has a contact region 124 for abutment against the adjustment arm 31. The contact region 124 is in abutment against the adjustment arm 31 in a state pretensioned by the resilient element 130 at a side of the adjustment arm 31 facing away from the tooth segment 33 and pretensions the adjustment arm 31 and consequently the tooth segment 33 in the direction of the pinion 25. A relative sliding movement takes place between the contact region 124 of the sliding element 120 and the adjustment arm 31 during an adjustment of the height adjustment kinematics 5.

The resilient element 130 is arranged between the first end region 121 and the second end region 122 of the sliding element 120. The resilient element 130 is in this instance arranged between the contact region 124 and the first end region 121, but in modifications of the embodiment may also be arranged between the contact region 124 and the second end region 122 or in the contact region 124.

The resilient element 130 is a plastics material or rubber component, in this instance an elastomer component. The resilient element 130 has in this instance a parallelepipedal basic shape, but may also be constructed differently from this. The resilient element 130 is supported on the side portion 11. To this end, the resilient element 130 may have a slot which is fitted on a sheet metal flap of the side portion 11.

The first end region 121 is articulated by way of a first support means 140 on the side portion 11. The first support means 140 acts as a counter-bearing for the first end region 121. The first support means 140 is in this instance a bolt, threaded bolt or a screw, preferably screwed into a thread or a welding nut of the side portion 11. The first end region 121 is pressed against the first support means 140 by means of the resilient element 130.

The second end region 122 is articulated to the side portion 11 by way of a second support means 150. The second support means acts as a counter-bearing for the second end region 122. The second support means 150 has in this instance a disc 152 with a circular outer periphery and a securing element 154 (in particular threaded bolt or screw) for connecting the second support means 150 to the side portion 11. The second end region 122 is pressed by means of the resilient element 130 against the outer periphery of the disc 152 of the second support means 150. As a result of the eccentricity of the outer periphery of the disc 152 for the securing thereof to the side portion 11, the pretensioning of the sliding element 120 and the resilient element 130 can be adjusted by rotating the disc 152, in particular during the assembly of the vehicle seat 1. Consequently, a pretensioning of the resilient element 130 and/or the sliding element 120 can be adjusted by way of the second support means 150.

The second support means 150 additionally has in this instance a securing element 156 which protrudes from the disc 152 in such a manner that the sliding element 120 is secured in a direction parallel with the transverse direction y against sliding from the adjustment arm 31.

The resilient element 130 acts on the sliding element 120 between the two end regions 121, 122, consequently between the two support means 140, 150 which act as counter-bearings, with such a force that, preferably with resilient deformation of the sliding element 120 and the resilient element 130, the contact region 124 of the sliding element 120 is tensioned against the adjustment arm 31 in such a manner that the play between the pinion 25 and the tooth segment 33 is eliminated.

The features disclosed in the above description, the claims and the drawings may be significant both individually and in combination for carrying out the invention in the various embodiments thereof.

LIST OF REFERENCE NUMERALS

1 Vehicle seat
3 Base
3.1 Upper rail
3.2 Lower rail
3.3 Rear adapter portion
3.4 Front adapter portion
5 Height adjustment kinematics
6 Drive device
7 Front link
9 Rear link
11 Side portion
13 Seat frame
15 Seat cushion
17 Backrest
25 Pinion
27 Pinion rotation axis
31 Adjustment arm
33 Tooth segment
41 Adapter
100 Tensioning device
120 Sliding element
121 First end region
122 Second end region
124 Contact region
130 Resilient element
140 First support means
150 Second support means
152 Disc
154 Securing element
156 Securing element
I First pivot joint
II Second pivot joint
III Third pivot joint
IV Fourth pivot joint
G Joint
x Longitudinal direction
y Transverse direction
z Vertical direction

What is claimed is:

1. A vehicle seat having a drive device for driving adjustment kinematics of the vehicle seat, comprising:
an adjustment arm, and
a tensioning device,
wherein the drive device has a pinion which can be rotated about a pinion rotation axis and which is in toothed engagement with a tooth segment of the adjustment arm,
wherein the tensioning device pretensions the adjustment arm in such a manner that the tooth segment is pretensioned in the direction of the pinion,
wherein the tensioning device has at least one sliding element which is in abutment with the adjustment arm,
wherein, during an actuation of the height adjustment kinematics, the at least one sliding element slides along the adjustment arm,
wherein the sliding element is resiliently pretensioned by a resilient element,
wherein the sliding element is produced from a resilient material, and
wherein the resilient element is a pressure piece of elastomer material,
wherein a height adjustment kinematics can be driven by the drive device and in that the height adjustment kinematics has a base, a side portion, a front link and a rear link,
wherein the base, the side portion, the front link and the rear link form four coupling members of a four-bar arrangement, wherein a first pivot joint pivotably connects the base to the rear link, a second pivot joint pivotably connects the rear link to the side portion, a third pivot joint pivotably connects the side portion to the front link and a fourth pivot joint pivotably connects the front link to the base,
wherein a region of the adjustment arm facing away from the tooth segment is articulated in an eccentric manner with respect to the pivot joints to one of the coupling members and the drive device is articulated to another of the coupling members.

2. The vehicle seat according to claim 1, wherein the sliding element is produced from a spring steel.

3. The vehicle seat according to claim 2, wherein the sliding element is bent from a spring wire or a spring sheet.

4. The vehicle seat according to claim 1, wherein the sliding element has a first end region and a second end region, the first end region is supported by way of a first support device on a structural component of the vehicle seat, including on a side portion of a seat frame, and the second end region is supported by way of a second support device on the structural component of the vehicle seat, including on the side portion of the seat frame.

5. The vehicle seat according to claim 4, wherein the sliding element has, between the first end region and the second end region, a contact region for abutment with the adjustment arm.

6. The vehicle seat according to claim 5, wherein the contact region is in abutment with the adjustment arm.

7. The vehicle seat according to claim 6, wherein the contact region, in a pretensioned state by the resilient element, is in abutment with the adjustment arm.

8. The vehicle seat according to claim 1, wherein the region of the adjustment arm facing away from the tooth segment is articulated to the rear link and the drive device, and also the tensioning device, are secured to the side portion.

* * * * *